US012580656B2

(12) United States Patent
Fok et al.

(10) Patent No.: US 12,580,656 B2
(45) Date of Patent: Mar. 17, 2026

(54) RF STEGANOGRAPHY BASED ON PHOTONICS

(71) Applicant: University of Georgia Research Foundation, Inc., Athens, GA (US)

(72) Inventors: Mable P. Fok, Bishop, GA (US); Qidi Liu, Athens, GA (US)

(73) Assignee: UNIVERSITY OF GEORGIA RESEARCH FOUNDATION, INC., Athens, GA (US)

( * ) Notice: Subject to any disclaimer, the term of this patent is extended or adjusted under 35 U.S.C. 154(b) by 190 days.

(21) Appl. No.: 18/271,762

(22) PCT Filed: Jan. 11, 2022

(86) PCT No.: PCT/US2022/070139
§ 371 (c)(1),
(2) Date: Jul. 11, 2023

(87) PCT Pub. No.: WO2022/150856
PCT Pub. Date: Jul. 14, 2022

(65) Prior Publication Data
US 2024/0080101 A1 Mar. 7, 2024

Related U.S. Application Data

(60) Provisional application No. 63/135,808, filed on Jan. 11, 2021.

(51) Int. Cl.
*H04B 10/27* (2013.01)

(52) U.S. Cl.
CPC ....... *H04B 10/27* (2013.01); *H04B 2210/003* (2013.01); *H04B 2210/006* (2013.01); *H04B 2210/256* (2013.01)

(58) Field of Classification Search
CPC .............. H04B 10/27; H04B 2210/003; H04B 2210/006; H04B 2210/256
(Continued)

(56) References Cited

U.S. PATENT DOCUMENTS 7,725,028 B1 * 5/2010 Birk .......................... H04N 7/22
398/71
2003/0185574 A1 * 10/2003 Inada ............... H04B 10/25253
398/147
(Continued)

OTHER PUBLICATIONS

International Search Report for PCT/US2022/070139 mailed Mar. 16, 2022.
(Continued)

*Primary Examiner* — Dalzid E Singh
(74) *Attorney, Agent, or Firm* — Thomas | Horstemeyer, LLP

(57) ABSTRACT
Various examples are provided related to single channel and multi-channel radio frequency (RF) steganography. In one example, a method includes generating an amplified spontaneous emission (ASE) broadband signal; spectrally slicing the ASE broadband light to achieve taps for generating a dynamic photonic finite impulse response in an RF domain; generating a stealth-modulated broadband optical carrier by combining a stealth signal with the spectrally sliced ASE broadband light; passing the stealth-modulated broadband optical carrier to a dispersive medium to achieve the dynamic photonic FIR in the RF domain; and transmitting the stealth-modulated optical comb carrier via a transmission fiber. The ASE broadband light can have wavelength and intensity corresponding to background noise of a photonic system. In another example, a system for RF steganography includes a stealth transmitter. The stealth transmitter can generate and transmit the stealth-modulated optical comb carrier to a stealth receiver via a transmission fiber.

20 Claims, 9 Drawing Sheets

(58) Field of Classification Search
USPC ............................................................ 398/58
See application file for complete search history.

(56) References Cited

U.S. PATENT DOCUMENTS

| | | | |
|---|---|---|---|
| 2004/0042061 A1 | 3/2004 | Islam et al. | |
| 2012/0113494 A1* | 5/2012 | Yi ...................... | G02B 6/02085 |
| | | | 359/238 |
| 2013/0321820 A1 | 12/2013 | Flanders et al. | |
| 2014/0268309 A1 | 9/2014 | Strohkendl | |
| 2016/0231235 A1 | 8/2016 | Gulati et al. | |
| 2018/0062603 A1 | 3/2018 | Fok et al. | |
| 2019/0158186 A1* | 5/2019 | Schmogrow ........ | H04J 14/0298 |
| 2022/0360337 A1* | 11/2022 | Sadot ..................... | H04B 10/63 |

OTHER PUBLICATIONS

EP Search Report 22737359.4 mailed Oct. 25, 2024.
Su Guorui, et al., "Performance Analysis of Multi-User Optical Steganography Transmission System Based on Filtered Amplified Spontaneous Emission Noise", Special Section on IEEE Photonics Society Section, vol. 7, Nov. 22, 2019.
Liu Qidi, et al., "Bioninspired Photonics: Camouflage Strategies from Marine Hatchfish for Optical RF Steganography", 2021 IEEE Research and Applications of Photonics in Defense Conference (RAPID), IEEE, Aug. 2, 2021.

* cited by examiner

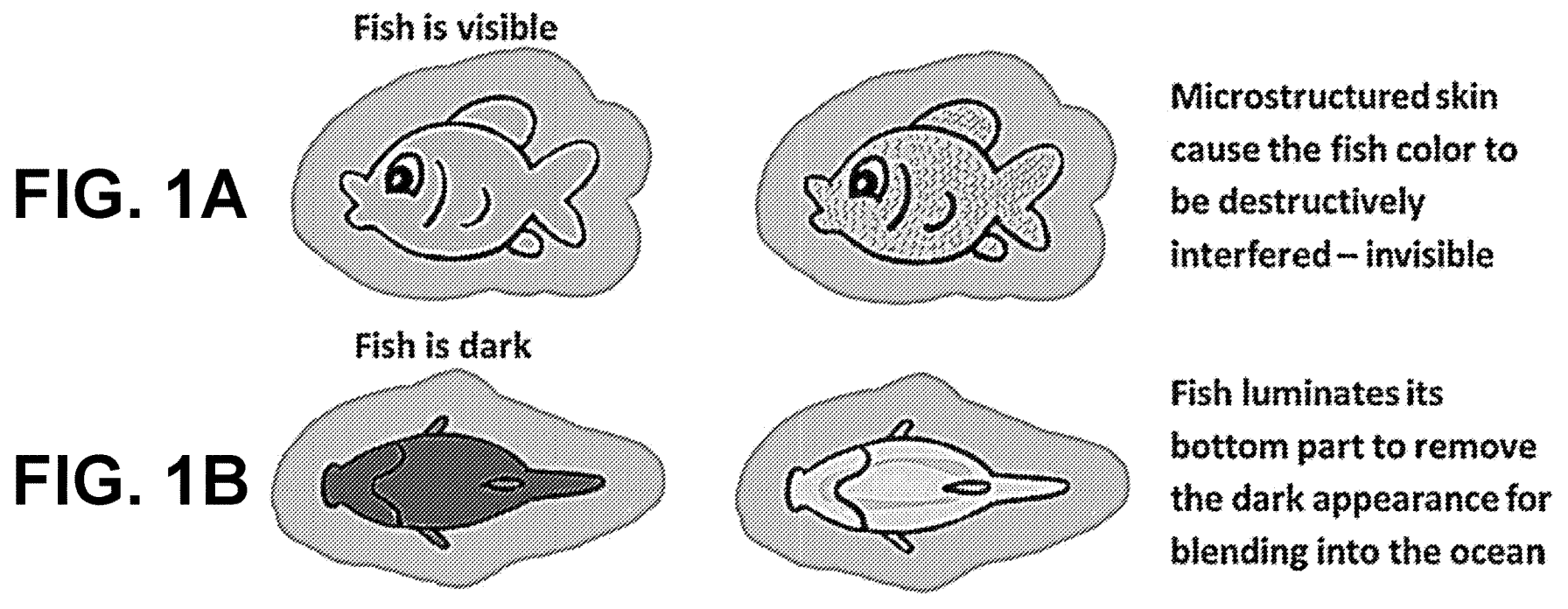

Microstructured skin cause the fish color to be destructively interfered – invisible Fish is visible

FIG. 1A

Fish luminates its bottom part to remove the dark appearance for blending into the ocean Fish is dark

FIG. 1B

RF STEGANOGRAPHY BASED ON PHOTONICS

CROSS REFERENCE TO RELATED APPLICATIONS

This application is the 35 U.S.C. § 371 national stage application of PCT Application No. PCT/US2022/070139, filed Jan. 11, 2022, which claims priority to, and the benefit of, U.S. provisional application entitled "MARINE HATCHETFISH INSPIRED RF STEGANOGRAPHY BASED ON PHOTONICS", having Ser. No. 63/135,808, filed Jan. 11, 2021, which are hereby incorporated by reference herein in their entireties.

STATEMENT REGARDING FEDERALLY SPONSORED RESEARCH OR DEVELOPMENT

This invention was made with government support under grants No. 1653525 and 1917043 awarded by the National Science Foundation. The government has certain rights in the invention.

BACKGROUND

Information security has always demanded new strategies to protect sensitive information since most aspects of our society from online social media, mobile computing, security service, health care service, smart city, to online banking are intensively connected using optical and radio frequency (RF) networks. Massive amounts of sensitive, confidential, and personal information are being transmitted, processed, and stored every second; thus, networks and information have to be protected against malicious attacks to prevent attacker from intercepting or stealing the sensitive information. While encryption is mainly used to protect sensitive information, the presence of the information has not been concealed—meaning that the attacker can still see the presence of the encrypted information and it is just a matter of time before they decrypt it through approaches like brute force attack.

SUMMARY

Camouflage is a strategy that animals utilize for concealment in their habitat, making themselves invisible to their predators and preys. In RF systems, steganography or stealth transmission is the camouflage of information—a technology of hiding and transmitting secret messages in public media. Steganography conceals the secret message in publicly available media such that the eavesdropper or attacker will not be able to tell if there is a secret message to look for. Marine hatchetfish have two effective camouflage skills to help them hide from their predators—silvering and counterillumination. For silvering, a marine hatchetfish uses its microstructured skin on its sides to achieve destructive interference at colors that could indicate the presence of the fish. For counterillumination, the fish emits light at its bottom part to match its color and intensity to the surroundings, making it invisible from below. These underwater camouflage strategies can be mimicked with photonic phenomena and applied as camouflage strategies for physical stealth transmission of a stealth (or secret) signal over optical fiber or networks.

Aspects of the present disclosure are related to radio frequency (RF) steganography in, e.g., single and multi-channel applications. The proposed bio-inspired steganography strategies are disclosed and shown to successfully hid the secret signal in plain sight in temporal, RF spectral, and optical spectral domains, by blending in using counterillumination and self-destructing based on silvering techniques in case of interception. The steganography methodology was demonstrated for physical stealth transmission of a 200 MBaud/s 16 QAM OFDM stealth signal at 5 GHz over a 25-km of optical fiber. The stealth signal can only be retrieved with precise and correct parameter for constructive interference at the secret signal frequency at the designated location to unmask the silvering.

In one aspect, among others, a method for radio frequency (RF) steganography comprises generating an amplified spontaneous emission (ASE) broadband signal, the ASE broadband light having wavelength and intensity corresponding to background noise of a photonic system; spectrally slicing the ASE broadband light to achieve taps for generating a dynamic photonic finite impulse response (FIR) in an RF domain; generating a stealth-modulated optical comb carrier by combining a stealth signal with the spectrally sliced ASE broadband light; passing the stealth-modulated optical comb carrier to a dispersive medium to achieve dynamic photonic FIR in the RF domain; and transmitting the stealth-modulated optical comb carrier via a transmission optical fiber. In one or more aspects, the stealth-modulated optical comb carrier can be combined with a public signal and system noise prior to transmission. The stealth-modulated optical comb carrier can be transmitted to a stealth receiver and a public receiver via the transmission fiber. The transmission fiber can have a positive dispersion sign. The transmission fiber can comprise a dispersion compensating fiber at a distal end.

In various aspects, the stealth signal can be retrieved by a stealth receiver comprising a matched dispersion medium providing constructive interference at a stealth signal frequency associated with the stealth signal. The matched dispersion medium can be a dispersion compensation fiber. The stealth signal can be converted to a digital signal for processing by digital signal processing circuitry. Generating the stealth-modulated optical comb carrier can comprise combining a plurality of stealth signals with the spectrally sliced ASE broadband light. The spectrally sliced ASE broadband light can be designed based on the plurality of stealth signals. The stealth-modulated optical comb carrier can be transmitted to a plurality of stealth receivers via the transmission fiber. Each of the polarity of stealth receivers can comprise a matched dispersion medium providing constructive interference at a stealth signal frequency associated with one of the plurality of stealth signals. Each of the plurality of stealth signals can be associated with a corresponding stealth signal frequency. The stealth-modulated optical comb carrier can be received by a stealth receiver comprising a plurality of matched dispersion mediums each providing constructive interference at a corresponding stealth signal frequency associated with at least one of the plurality of stealth signals.

In another aspect, a system for radio frequency (RF) steganography comprises a stealth transmitter coupled to a transmission fiber, the stealth transmitter configured to: generate a stealth-modulated optical comb carrier by combining a stealth signal with a spectrally sliced amplified spontaneous emission (ASE) broadband light; pass the stealth-modulated optical comb carrier through a dispersive medium to achieve dynamic photonic FIR in the RF domain; and transmit the stealth-modulated optical comb carrier to a stealth receiver via the transmission fiber. In one or more aspects, the stealth transmitter can comprise an optical modulator (MOD) that combines the stealth signal with the spectrally sliced ASE broadband light. The optical modulator can be an electro-optic intensity modulator (MZM), an electro-optic phase modulator, or an electro-absorption modulator. The stealth transmitter can comprise an arbitrary waveform generator (AWG) configured to generate the stealth signal from stealth data and a public signal from public data. The public signal can be modulated by an electro-optic intensity modulator (MZM) onto a DFB laser output and combined with the stealth-modulated optical comb carrier prior to transmission via the transmission fiber. Generating the stealth-modulated optical comb carrier can comprise combining a plurality of stealth signals with the spectrally sliced ASE broadband light. In various aspects, the system can comprise a stealth receiver coupled to the transmission fiber, the stealth receiver comprising a matched dispersion medium that provides constructive interference at a stealth signal frequency associated with the stealth signal. The stealth receiver can comprise a photodetector and digital processing circuitry configured to convert the stealth signal to a digital signal for processing. The system can comprise a public receiver coupled to the transmission fiber.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1A and 1B illustrate two camouflage skills in marine hatchetfish, in accordance with various embodiments of the present disclosure.

DETAILED DESCRIPTION

Figure 2:
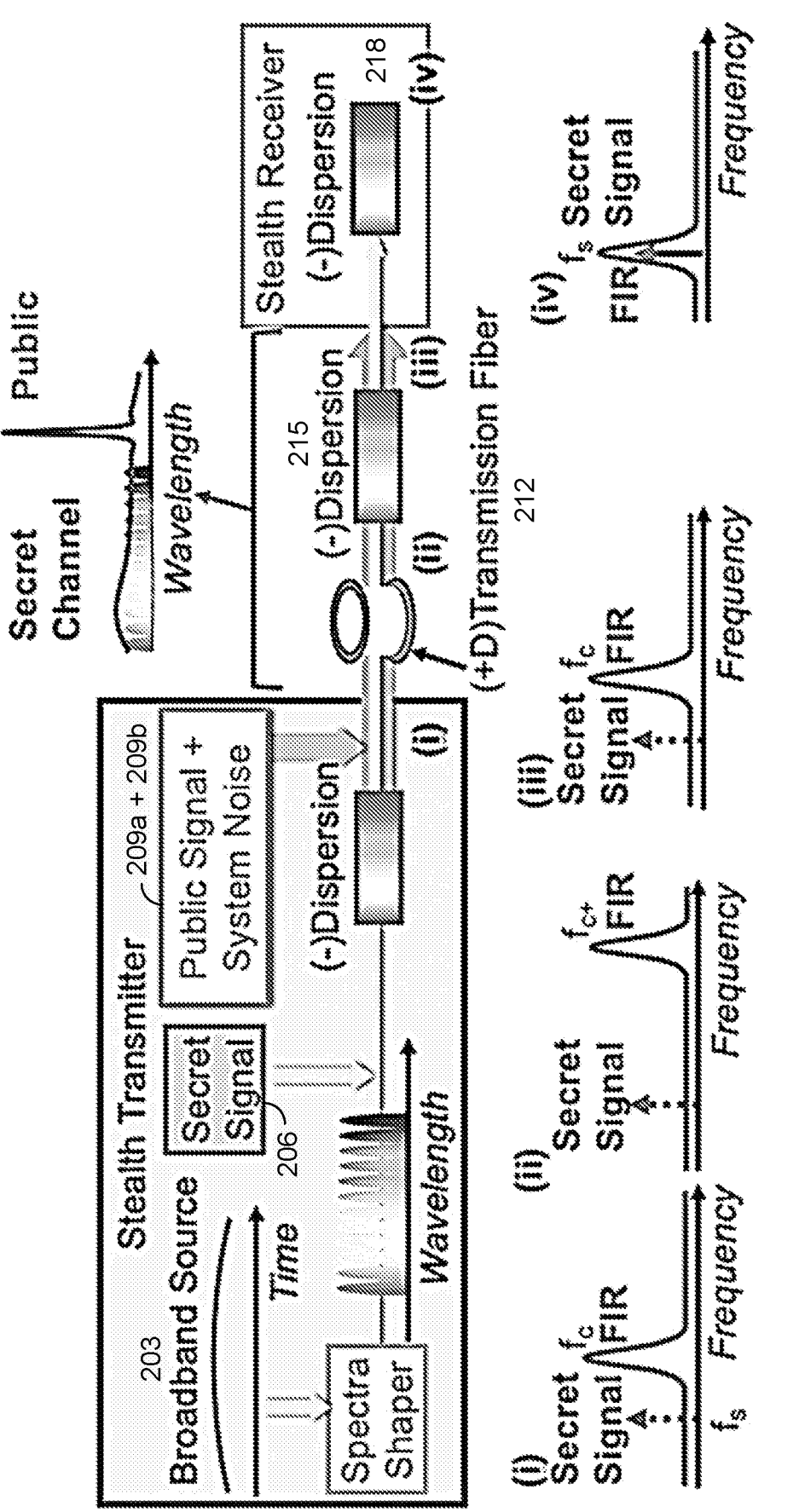
FIG. 2 illustrates an example of optical steganography for RF signal transmission over the fiber, in accordance with various embodiments of the present disclosure.

Disclosed herein are various examples related to radio frequency (RF) steganography when transmitting over an optical fiber. Effective cryptography includes two major components, encryption and steganography. Encryption scrambles the sensitive information so that it is unreadable without the key, while steganography hides the sensitive information within ordinary information to maintain its secrecy during transmission so that the attacker will not even know there is a signal to look for. Therefore, an effective cryptography scheme can ensure confidentiality, integrity, and authentication of information. Reference will now be made in detail to the description of the embodiments as illustrated in the drawings, wherein like reference numbers indicate like parts throughout the several views.

Fiber optics is the backbone of most communication networks that connects cities and nations across oceans and continents, as well as supporting radio-over-fiber transmission of mobile radio frequency signal (i.e. 5G and WiFi). Therefore, there is a need to physically secure the sensitive information during transmission in the data link using physical cryptography. Physical encryption techniques have been studied intensively, however steganography in the physical layer have always been overlooked. Physical encryption can be achieved using either optical or electronic approaches. In an electronic scheme, chaos mapping can be done by masking or scrambling using a digital chaotic signal in a passive optical network (PON) at the physical layer. In an optical scheme, encryption can be achieved via nonlinear dynamics for high-quality chaos synchronization, semiconductor laser with optical feedback for key space enhancement, and/or double-random phase encoding in the fractional Fourier domain.

Electrical RF steganography has been shown to successfully hide the digitally modulated communication information via linear chirp radar signals, however electrical RF steganography systems have a low bandwidth. Because of their electromagnetic wave nature, they easily suffer from electromagnetic interference and are vulnerable to steganalysis—detecting messages hidden using steganography. In a fiber optic network, optical signals are transmitted inside an optical fiber. Although fiber optic cables are immune to typical electromagnetic interference (EMI) security attacks, it is possible to intercept an optical signal successfully by "tapping" into the fiber. Fiber tapping techniques include fiber bending, splitting, evanescent coupling, and scattering. Fiber bending is the easiest way to tap into a fiber and is the hardest to be noticed by the legitimate user. Even easy-to-use clip-on optical couplers are available online for easy tapping into a fiber optic network. Therefore, there is a need to physically maintain the secrecy of sensitive signals being transmitted inside such a vulnerable optical fiber. Optical steganography is mainly done by spreading the stealth signal over an extremely wide optical spectrum (e.g., a stealth optical pulse train from mode-locked laser with a wide spectrum or broadband amplified spontaneous emission (ASE) noise) such that the stealth signal may be buried under the system noise. In the temporal domain, the low data-rate stealth short optical pulse is spread across a long time slot via dispersion, such that it is hidden underneath the system noise and public channel. Both spread spectrum and temporal spreading are just using a larger bandwidth or a large temporal interval to decrease the amplitude of the sensitive signal so that its appearance can be hidden in the public domain. However, when the eavesdropper intercepts the transmission, the stealth signal that carries sensitive information would still fall into the eavesdropper's hand but only hiding. It is important to develop a steganography technique that would self-destroy the sensitive signal if it is not received by the legitimate user.

Turning to nature, animals conceal their presence in their surroundings via camouflage—an extremely efficient way to ensure their survival. Borrowing camouflage strategies from animals can be an effective solution towards steganography in RF and optical systems. Among different types of camouflage, underwater camouflage is powerful because of the multi-dimensional concealment it can achieve. Underwater camouflage helps sea animals to hide from predators from above the water, being invisible from its side, and removing its dark appearance when seen from below. For example, marine hatchetfish have some of these powerful camouflage skills for survival—silvering and counterillumination.

A marine hatchetfish has microstructured skin on its sides to achieve destructive interference at colors that could indicate the presence of the fish, while constructive interference occurs at colors that is similar to their surroundings. This technique is known as silvering. At the same time, the marine hatchetfish also emits light from the bottom part of its body to match its color and intensity to its surroundings to make them invisible from below. This is referred to as counterillumination. FIGS. 1A and 1B illustrate examples of the two camouflage skills present in marine hatchetfish. As illustrated in the two side views of FIG. 1A, the fish is visible with no camouflage while the use of silvering allows the fish to destructively interfere with the colors that could indicate the presence of the fish. The bottom views of FIG. 1B show that without camouflage the fish appears darker against the bright water surface when seen from below and with counterillumination the fish can illuminate itself to the same color and intensity as the background.

This disclosure presents a methodology that can mimic two ocean camouflage techniques—silvering and counterillumination—using photonics and applying them as optical steganography techniques for stealth transmission of OFDM signals in radio-over-fiber networks. The mimicking of silvering—the use of destructive interference to achieve self-destruction in case of interception—can be achieved using a dynamic optical finite impulse response (FIR) structure such that the stealth signal is destructively interfered to the attacker at any point of the transmission. While the mimicking of counterillumination—the production of light to match the background in brightness and color—can be achieved using a wideband low intensity light as the optical carrier to match with the background noise in the system. Principle FIG. 2 illustrates an example of a design of the bio-inspired optical steganography scheme. To achieve counter-illumination, a broadband ASE source 203 generated from, e.g., an erbium doped fiber amplifier (EDFA) can be used as the optical carrier for the stealth OFDM signal (or secret signal) 206 to "illuminate" at the same wavelength and intensity as the background system noise 209b, such that no distinct optical spectral component is observed. The broadband ASE source 203 is spectrally sliced to achieve a desired photonic RF FIR in the RF domain when passing through a dispersive medium for "silvering", such that destructive interference at the stealth signal frequency ($f_S$) results in the attacker's view, hiding the stealth (or secret) signal 206 in both the RF spectral domain and the temporal domain and self-destroy in case of interception.

The result of the silvering at point (i) is shown in corresponding plot of FIG. 2. The photonic RF FIR creates a destructive interference condition at the stealth signal frequency ($f_S$). As shown, the constructively interfered frequency ($f_C$) will be way above the frequency range of interest. Nothing will be observed since there is no signal transmission at that frequency range. The stealth-modulated broadband optical carrier is combined with the public signal 209a and system noise 209b for transmission, resulting in a complete submerging of the stealth signal 206 underneath the system noise 209b, hiding the stealth signal 206 in the optical spectral domain. The transmission fiber 212 has a positive dispersion sign that will further move the constructively interfered frequency to an even higher frequency ($f_{C+}$) as the signal propagates to point (ii). As shown in the corresponding plot (ii), $f_{C+}$ is much further away from the stealth signal frequency ($f_S$).

In most optical networks, dispersion compensating fiber 215 with negative dispersion is placed at the last section of the transmission to correct any temporal spreading caused by the transmission fiber 212. The presence of the dispersion compensating fiber 215 will move the constructive interference frequency at point (iii) back to $f_C$, as shown in the corresponding plot. The attacker will not be able to observe any trace of the stealth (or secret) signal 206 in the optical spectrum, RF spectrum, or time domain at any point of the transmission. As a result, there is no reason for the attacker to attack the "empty" channel, successfully achieving steganography. Furthermore, the stealth signal would be destructively interfered once the attacker tries to intercept and receive the signal, such that the attacker will not be able to get a hold of the hidden stealth signal. At the intended receiver, a precisely matched dispersion 218 can be used to achieve constructive interference at the stealth signal frequency ($f_S$) at the designated location, revealing the stealth signal 206. Due to the broadcast characteristic of PON, other public receiver will just treat the secret channel as system noise. The correct dispersion in the stealth receiver allows a constructive interference condition to occur at the stealth signal frequency ($f_S$) as shown in the corresponding plot of point (iv).

Experimental Details

Figure 3:
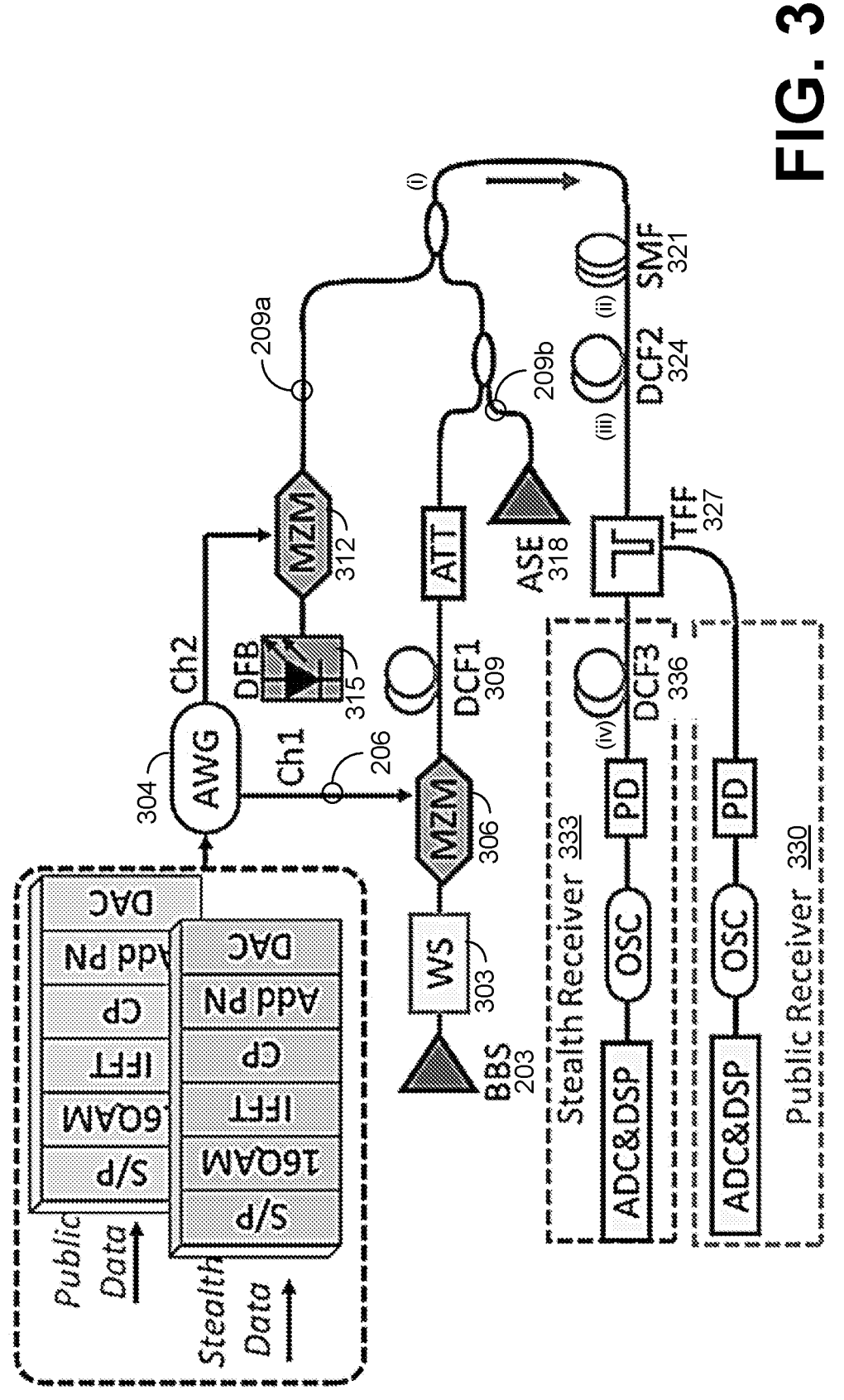
FIG. 3 illustrates an example demonstrating the steganography scheme for concealment of a stealth signal and self-destruction of a stealth signal in case of interception, in accordance with various embodiments of the present disclosure.

Referring next to FIG. 3, shown is an experimental setup of the bio-inspired optical steganography for OFDM-PON. An optical broadband source 203 from, e.g., an erbium doped fiber amplifier (EDFA) that covered the wavelength range from 1528 to 1568 nm was shaped to 20 nm wide and sliced by an optical wave shaper (WS) 303 (e.g., Finisar 1000S). A dual channel 12 Gb/s arbitrary waveform generator (AWG) 304 (e.g., Keysight 8190A) was used as the RF signal source to generate both the stealth signal 206 (on Ch1) and the public signal 209a (on Ch2). Other RF signal sources can also be used. The stealth RF signal 206 was modulated onto the shaped optical source using an optical modulator such as, e.g., a 12 GHz electro-optic intensity modulator (MZM) 306. The optical modulator can be electro-optic intensity modulator (MZM), electro-optic phase modulator, an electro-absorption modulator, or other appropriate modulator. The stealth signal-modulated optical comb carrier was then launched to a dispersion compensation fiber (DCF1) 309 to introduce proper time delay between taps for generating the photonic RF FIR. Note that while a 1.5 km DCF1 with a dispersion coefficient of −255 ps/nm was used at the stealth transmitter in the experiment, the dispersion can be chosen to any value as long as the resultant FIR constructive interference condition occurs at a higher frequency than the stealth signal frequency ($f_S$).

Meanwhile, the public signal 209a was directly modulated by MZM 312 onto an output at 1553.33 nm from a DFB laser 315. In the experiment, noise from amplified spontaneous emission (ASE) 318 was added to mimic the wideband system noise that is normally found in a long-haul transmission system. The stealth signal 206, public signal 209a, and system noise 209b were combined and transmitted through a 25-km standard single mode fiber (SMF) 321 followed by a 2.5-km DCF2 324 for dispersion compensation in a PON. A three-port thin film filter (TFF) 327 with 3-dB bandwidth of 0.3 nm and center wavelength at 1553.33 nm was used to drop the public channel to the public receiver 330, leaving the hidden stealth signal for the stealth receiver 333. To observe the stealth signal, precise knowledge of the amount of dispersion and an exact location in at the transmission link are needed for the constructive interference condition to occur at the stealth signal frequency, which is only known to the stealth receiver but not the attacker. After passing through DCF3 336 at the stealth receiver 333, the stealth signal was converted back to the electrical domain using a photodetector (PD) and captured using a 128 GSa/s real-time sampling oscilloscope (OSC) (e.g., Keysight UXR0334A Infiniium) with 33 GHz bandwidth for digital signal processing (ADC&DSP).

To design the desired photonic RF finite impulse response (FIR) with center frequency $f_{FIR}$, the corresponding optical comb should have a FSR $\Delta\lambda_{FSR}$ governed by the following equation:

$$\Delta\lambda_{FSR} = \frac{1}{|D(L_{DCF1} + L_{DCF3})|f_{FIR}}, \qquad (1)$$

where D, $L_{DCF1}$, and $L_{DCF3}$ denote the dispersion coefficient, the length of the DCF1 309 and DCF3 336, respectively. The center frequency ($f_{FIR}$) will be right at the stealth signal frequency ($f_S$) after passing through all the optical fiber (i.e., DCF1 309, SMF 321, DCF2 324, and DCF3 336). However, the FIR center frequency $f_{FIR}$ will be away from $f_S$ at any point after the transmitter and before the end of DCF3 336. The large key space provided by the total dispersion makes it difficult to discover, search, or retrieve the stealth signal 206 without the precise knowledge of the correct dispersion. Then, the overall shape of the optical comb can be designed such that it is the correct RF filter profile at the stealth receiver 333 for retrieving the stealth signal 206. Therefore, the needed optical spectral shaping function can be expressed as:

$$T(\lambda) = \cos\left(\frac{\Delta\lambda_{full}}{\Delta\lambda_{FSR}} \cdot \frac{\lambda}{2}\right)\exp\left[-\frac{\lambda^2}{2\Delta\lambda_{FWHM}^2}\right], \qquad (2)$$

where $\Delta\lambda_{full}$ and $\Delta\lambda_{FWHM}$ are the total shaped optical bandwidth and full-width-half-maximum (FWHM) optical bandwidth, respectively. The stealth signal 206 will survive any inline optical amplifier that are intended to amplify the public signal 209a.

Figures 4A, 4B, 4C:
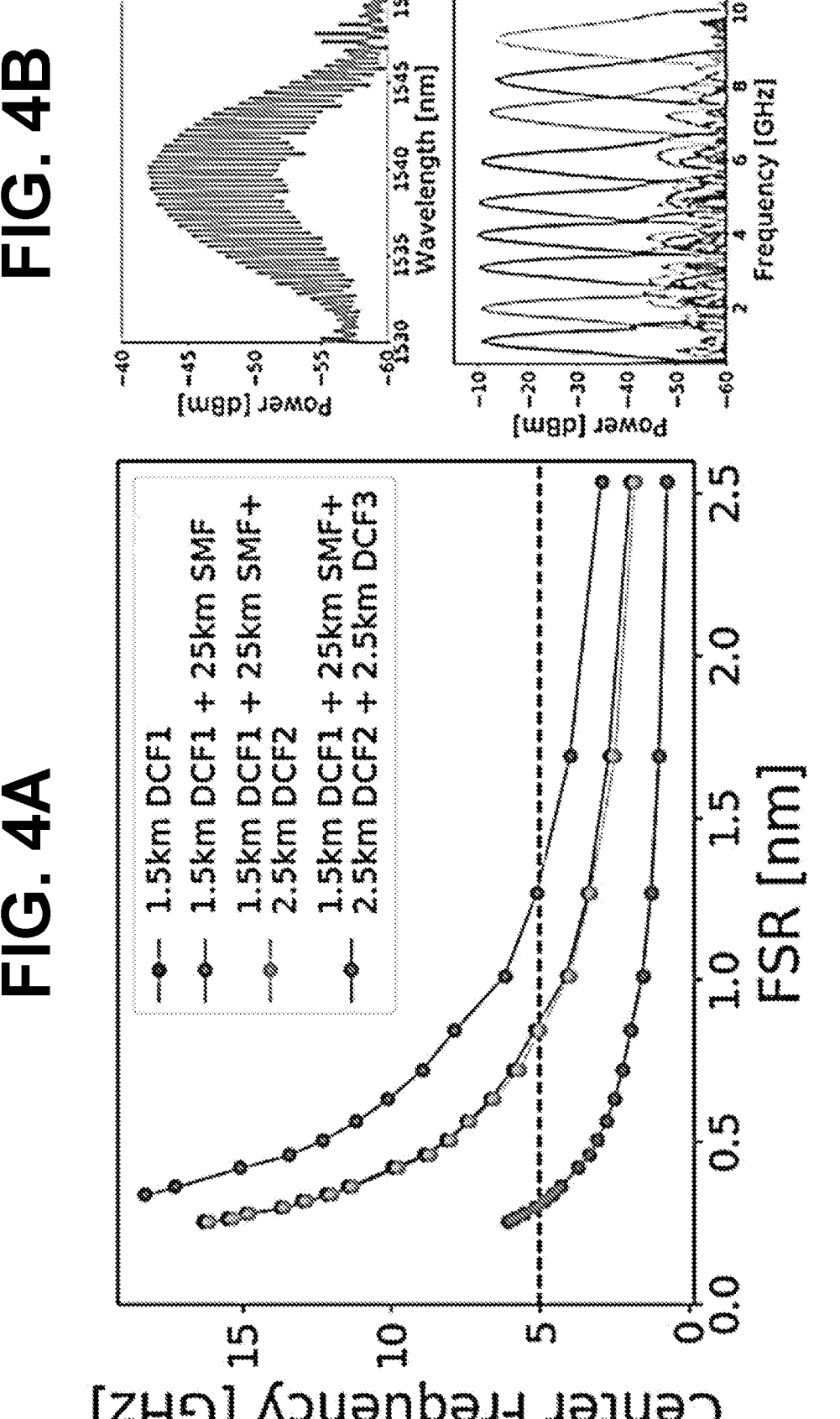
FIGS. 4A-4C illustrate examples of the relationship between constructive interference frequency ($f_{FIR}$) and designed FSR of an optical comb carrier, measured optical spectrum of the optical comb carrier, and tunable and reconfigurable constructive interference peaks, in accordance with various embodiments of the present disclosure.

FIGS. 4A-4C illustrate examples of experimental studies of the dynamic RF filter design. FIG. 4A illustrates the relationship between constructive interference frequency ($f_{FIR}$) and the designed FSR of the optical comb carrier at different fiber combinations; FIG. 4B shows measured optical spectrum of the shaped optical comb carrier; and FIG. 4C illustrates tunable and reconfigurable constructive interference peaks at different frequencies. In most scenarios, the length of the DCF and SMF cannot be changed easily; therefore, the FSR of the optical comb carrier can be changed to achieve the desired FIR frequency, as shown in FIG. 4A. In this experiment, the dispersion of the 1.5-km DCF1 and DCF3, 2.5-km DCF2, and 25-km SMF are −255 ps/nm, −425 ps/nm, and +425 ps/nm, respectively. An example of the shaped optical comb carrier is shown in FIG. 4B.

FIG. 4C was measured by a RF network analyzer showing the capability to tune the resultant RF response to different frequency for achieving destructive interference condition at different stealth signal frequency ($f_S$). The preliminary results support the feasibility of using the proposed design methodology for designing RF filters with high flexibility and customizability.

Figures 5A, 5B, 5C:
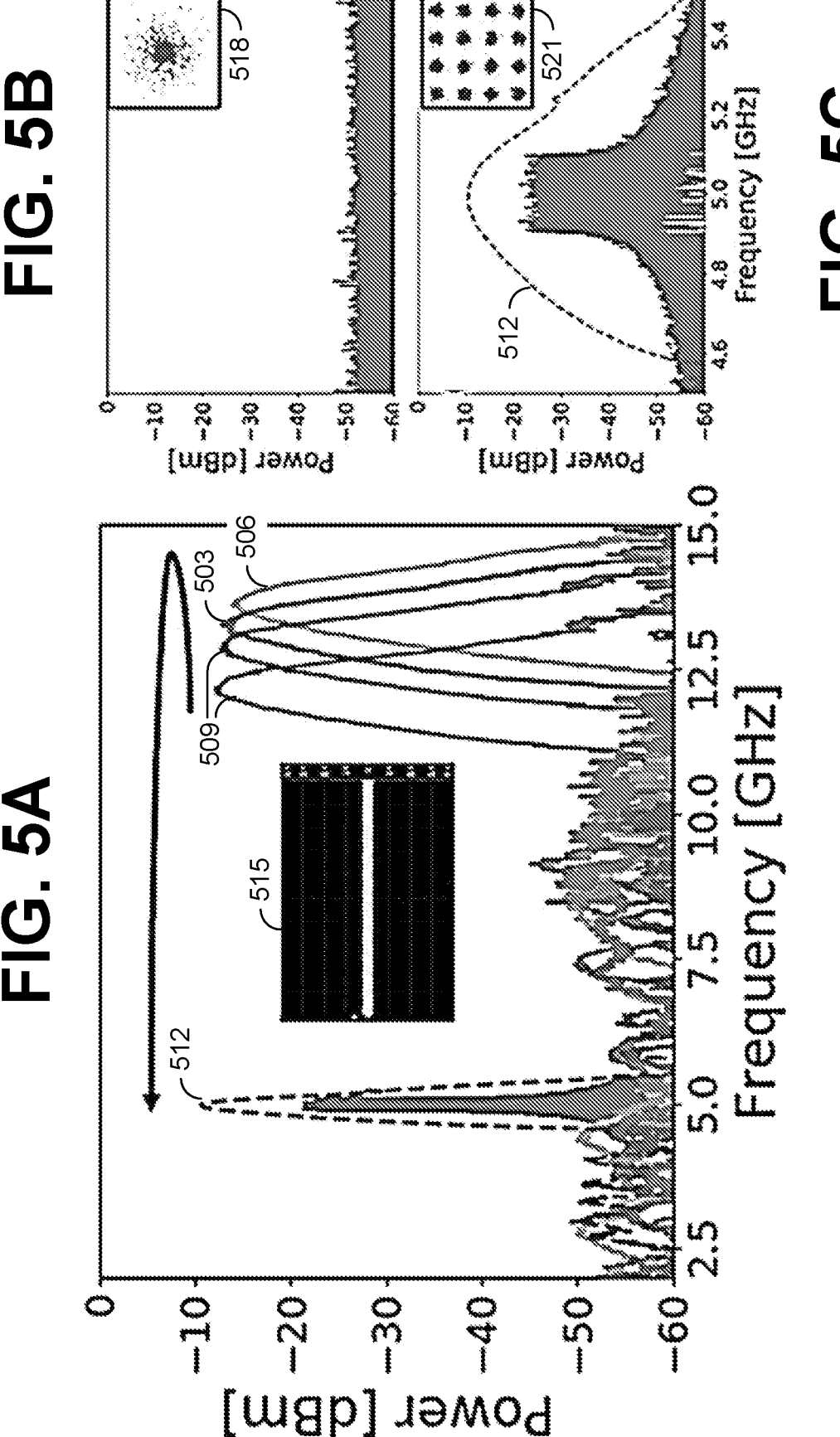
FIGS. 5A-5C illustrate examples of experimental results of the steganography scheme for concealment and self-destructive of a stealth signal, in accordance with various embodiments of the present disclosure.

In this experiment, the goal was to perform stealth transmission of a 200 MBaud/s 16 QAM-OFDM signal at 5 GHz. FIGS. 5A-5C illustrate examples of experimental results of the bio-inspired steganography scheme for the concealment of stealth signal. In FIG. 5A, curve 503 shows that the constructive interference condition occurs at 13.22 GHz after DCF1 309 (FIG. 3). Curve 506 illustrates that the positive dispersion of the SMF 321 (FIG. 3) moved the constructive interference condition to a higher frequency. As shown by the curves 509, DCF2 324 (FIG. 3) compensated the dispersion of SMF 321 in the public transmission nodes that moves the constructive interference peak to a slightly lower frequency. Therefore, nothing can be seen in the temporal domain as shown in 515. The matched dispersion at the stealth receiver 333 (FIG. 3) will shift the constructive interference condition to the stealth signal frequency at 5 GHz as shown by curve 512. FIG. 5B illustrates the RF spectrum and constellation diagram measured during transmission without a correct stealth receiver and FIG. 5C illustrates the RF spectrum and constellation diagram measured at the stealth receiver with correct dispersion.

An optical comb carrier with a spacing of 0.317 nm was used such that the destructive interference condition was achieved at 5 GHz (stealth signal frequency $f_S$) but with a constructive interference condition at 13.22 GHz (503 in FIG. 5A) at the transmitter. The constructive interference condition is only achieved at 5 GHz (stealth signal frequency $f_S$) when the accumulated dispersion is −680 ps/nm at the stealth receiver 333, as shown by curve 512 in FIG. 5A. Thus, no stealth signal can be observed at the starting point of the transmission. As the stealth signal 206 propagates in the SMF 321, the positive dispersion value of the SMF 321 reduces the total amount of dispersion. Thus, the constructive interference frequency is moved further up to a higher frequency $f_{C_+}$ (curve 506) while keeping the stealth signal 206 invisible at any point along the SMF 321.

During standard dispersion compensation in a PON or radio over fiber network, the amount of dispersion compensation will move the constructive interference frequency back to a slightly lower frequency $f_{C_-}$ (curves 509) but will not be enough to move it back all the way to the stealth signal frequency, keeping the stealth signal 206 invisible and under destructive interference condition at any location of the transmission. The constructive interference condition can only be moved back to the stealth signal frequency $f_S$ if the correct dispersion is used at the stealth receiver 333 (curve 512). The noise floor at the RF spectrum is at −50 dBm and can be improved by 10 dB using balanced detection.

When the public signal 209a is removed, the received signal was examined at the stealth receiver 333 without applying a correct dispersion. The stealth signal 203 was not visible in either the time domain or the RF spectral domain, as shown in the inset 515 of FIG. 5A and FIG. 5B, respectively. Furthermore, the corresponding constellation diagram in the inset 518 of FIG. 5B does not show any sign of the stealth signal 206—a noise like diagram resulted. Even if an eavesdropper tries to tap into the transmission fiber directly at different locations of the transmission, no trace of the stealth signal can be observed because the 5 GHz stealth frequency is at destructive interference along the whole transmission (as shown by the curves in FIG. 5A), similar to the silvering camouflage technique used by marine hatchetfish. At the stealth receiver 333, the stealth signal 206 can be retrieved only if the correct dispersion is used at the designated location, such that constructive interference condition occurs precisely at the stealth signal frequency of 5 GHz. FIG. 5C shows the resultant constructive interference condition at 5 GHz (curve 512) with the RF spectrum of the stealth signal, and a clear constellation diagram shown in the inset 521.

Similar to the marine hatchetfish where multiple camouflage skills are used to conceal its appearance in different view, the disclosed optical steganography scheme can also utilizes a second stealth technique to conceal its appearance in the optical spectral domain. As illustrated in FIG. 1, a marine hatchetfish uses counterillumination to illuminate itself to the same color and intensity as the background such that it will not appear dark against the bright water surface when seen from below. Here, the use of an incoherent broadband optical comb source acts like the counterillumination in marine hatchetfish, such that the appearance of the stealth signal 206 is similar to the ASE system noise 209b.

Figures 6A, 6B:
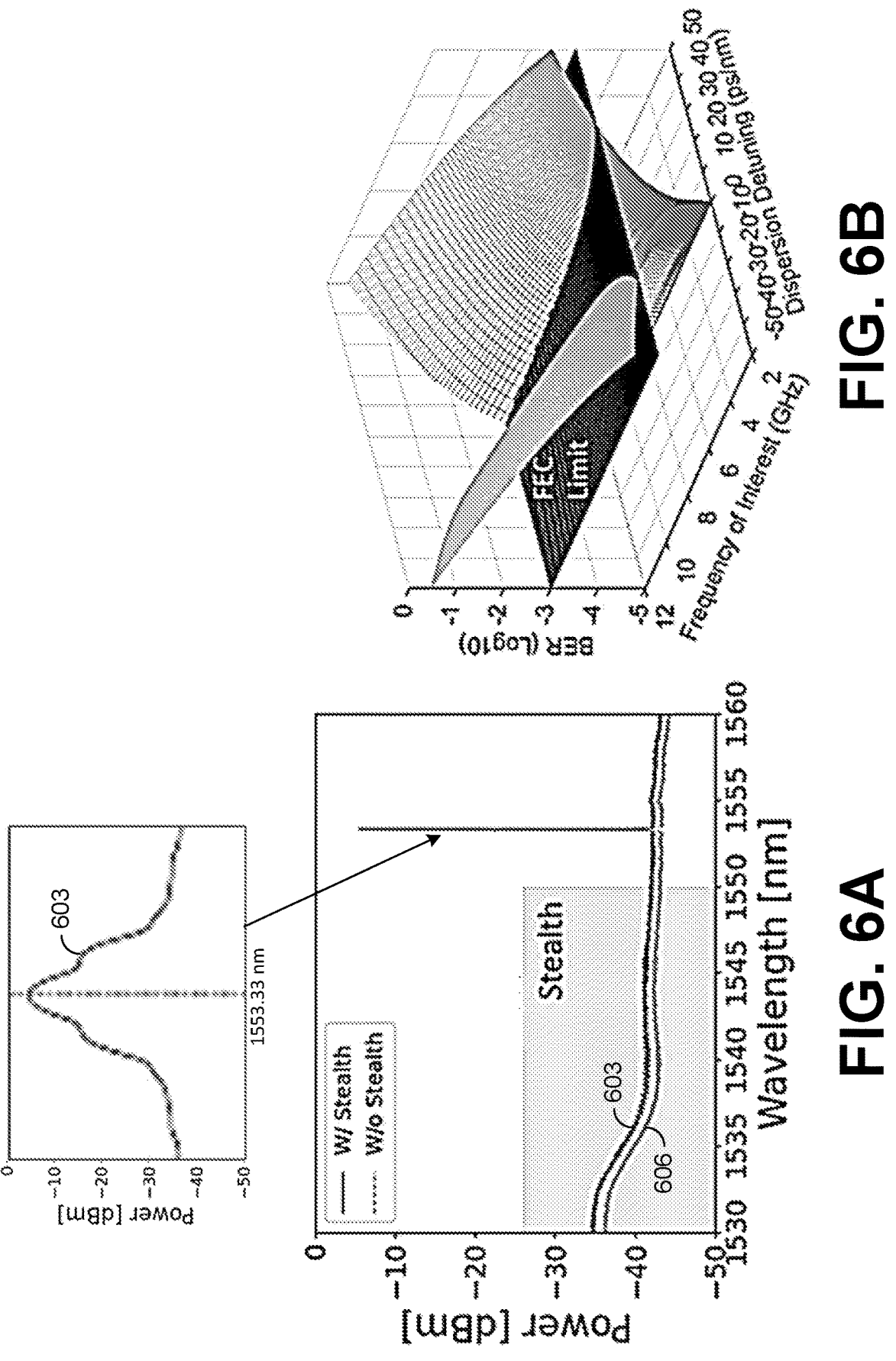
FIGS. 6A and 6B illustrate examples of measured optical spectra of transmission of the stealth signal and simulated mesh plot of the BER change with respect to dispersion mismatch and stealth signal frequency, in accordance with various embodiments of the present disclosure.

FIG. 6A illustrates an example of measured optical spectra of the transmission with (curve 603) and without (curve 606) the stealth signal 206. As shown, the broadband optical comb source has successfully concealed the trace of stealth signal 206 in optical spectral domain under the system noise. In case the eavesdropper attempts to use a coherent detection technique to detect the phase of the transmission that includes both the system noise 209b and the stealth signal 206, the bandwidth of coherent detection is limited by the photodiode and analog-to-digital conversion capability, which is in the order of 100 GHz, corresponding to only 2% of the ASE noise 209b and broadband comb source bandwidth used for the stealth signal 206, preventing the eavesdropper from digitizing or recording signal that is buried under the noise.

The goal of steganography is to conceal the stealth signal such that the attacker will not know if there is a signal to look for and the design described here can also self-destroy the stealth signal in case the attacker tries to intercept and receive the transmission. It is beneficial to know whether it is easy to unintentionally get the dispersion close enough to unconcealed the stealth signal. Therefore, the dispersion tolerance of the proposed bio-inspired optical steganography scheme was studied by investigating the relationship between BER, stealth signal frequency, and the dispersion offset. FIG. 6B illustrates a simulated mesh plot of the BER change with respect to the dispersion mismatch and the stealth signal frequency. To successfully demodulate a 16 QAM-OFDM signal, a forward error correction (FEC) threshold of $1 \times 10^{-3}$ is needed, as shown by the dark horizontal plane in FIG. 6B. As observed, the dispersion needed to be within a $\pm 10$ ps/nm dispersion mismatch to retrieve the hidden stealth signal at 5 GHz correctly.

A stealth signal 206 with a higher center frequency could increase the robustness of stealth transmission due to the tighter requirement of dispersion matching. The broadband characteristic of the optical comb prevents the eavesdropping by using a commercially available dispersion-tunable compensation module that has specific channel spacing (e.g., 0.8 nm). It would also be too slow to use a brute force approach to guess the dispersion if the dispersion of the stealth system could be dynamically changing. Furthermore, the estimation of dispersion using coherent detection could easily fail due to the noise nature of the broadband optical carrier that carries the stealth signal 206.

While concealing the stealth signal 206 is important, the transmission performance of the stealth signal 206 and the public signal 209a are equally important. BER measurements and constellation plots of the public and stealth signals were investigated.

Figure 7A:
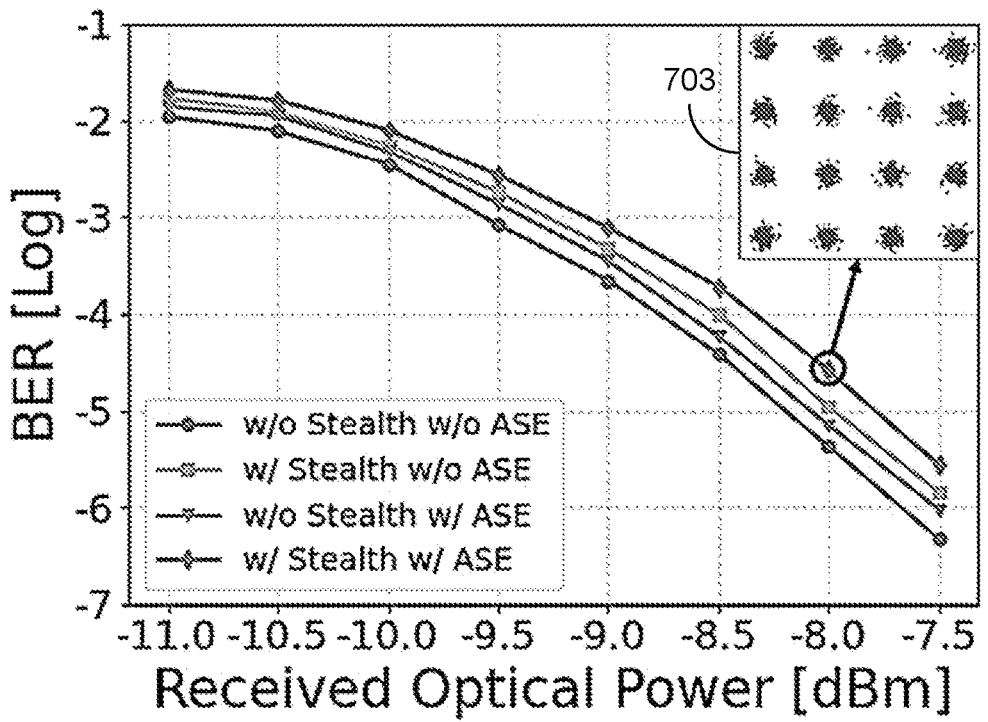
FIGS. 7A and 7B illustrate examples of BER measurements and constellation diagrams of the public signal and stealth signal under different condition, in accordance with various embodiments of the present disclosure.
Figure 7B:
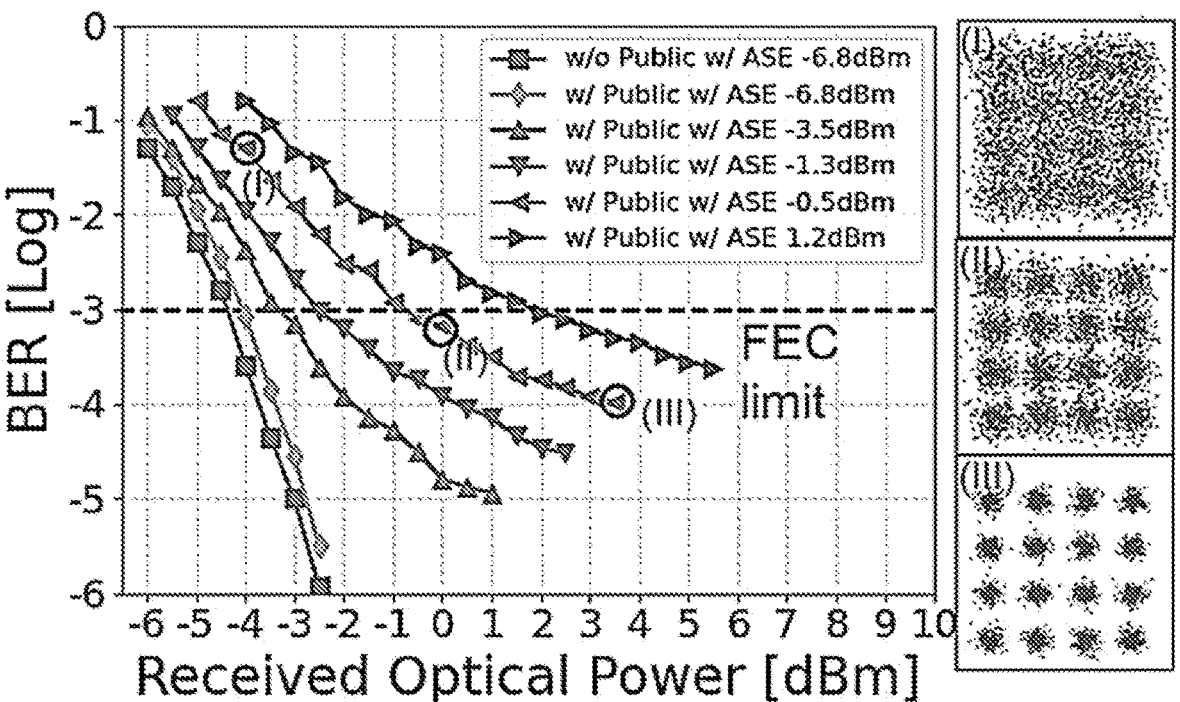

FIG. 7A shows the measured BER of the public channel with and without stealth signal 206 and system noise 209b, which indicates that only 0.2 to 0.4 dB power penalty is resulted when the stealth signal is added. FIG. 7A includes inset 703 showing the constellation diagram of the public channel with stealth signal 206 and system noise 209b. The addition of system noise will add another 0.3 dB of power penalty to the public signal. FIG. 7B shows the BER measurement of the stealth signal 206 when different amounts of system noise (noise power) is added to the transmission for better concealment. In the experiment, it is observed that a power penalty increased while still below the FEC limit as the system noise is increased. Comparing the −6.8 dBm curves with and without the public signal 209a, the presence of the public signal 209a has insignificant effect on the stealth signal BER. Constellation diagrams of the stealth signal 206 at various received power are shown in insets (I)-(III), indicating that the stealth signal 206 can be retrieved successfully if BER is below the FEC limit.

An optical steganography scheme has been disclosed for enhancing the security of RF signal transmitting in radio-over-fiber and optical networks. The approach borrows the silvering and counterilluminate camouflage strategies in marine hatchetfish, mimicking it with photonics, and applying it in the stealth transmission of a 16 QAM OFDM signal. Silvering is achieved by the generation of a destructive interference condition at the stealth signal frequency for the concealing and self-destroying of a stealth signal using photonic RF FIR, while counterillumination is achieved using a broadband optical comb source to blend in the wideband system noise. The disclosed steganography scheme can benefit cryptography when using with optical encryption. In the experimental evaluation, a 200 MBaud/s 16 QAM OFDM stealth signal at 5 GHz was successfully concealed in the temporal domain, the RF spectral domain, and the optical spectral domain. Moreover, the stealth transmission design may simplify the remote node function in future 5G networks and beyond for secure communication since the stealth is physically achieved without the need of high-speed digital signal process.

Multi-Channel and Multi-Band Self-Destructive Steganography

Emerging RF systems often support multi-function operation that makes use of multi-channel multi-band transmission. Therefore, there is a need to enable multi-channel and multi-band radio-over-fiber stealth transmission based on the disclosed steganography scheme. Most multi-band wireless systems operate in a heterogeneous manner to support multi-function operation, such that each frequency band is carrying signals with different modulation formats and data rates. Therefore, it is important to have a steganography system that supports multiple stealth channels. To support multiple stealth channels with same or different spectral properties, the FIR of each stealth channel would need to be tailored to effectively secure the multi-band/multi-channel stealth transmission. Therefore, the ability to customize the spectral shape and the exact spectral location for constructive and destructive interference for each frequency band in multi-band systems provides a better chance to ensure secure stealth transmission, minimize signal degradation, remove noise, and mitigate undesired interference. Next, the multi-band capability of the bio-inspired self-destructive steganography will be investigated.

Most multi-band wireless systems operate in a heterogeneous manner to support multi-function operation, such that each frequency band is carrying signal with different modulation formats and data rates. To support multiple stealth channels with the same or different spectral properties, the FIR of each stealth channel would need to be different to effectively secure the multi-band/multi-channel stealth transmission. Therefore, the ability to customize the spectral shape and the exact spectral location for constructive and destructive interference for each frequency band in multiband systems provides a better chance to ensure secure stealth transmission, minimize signal degradation, remove noise, and mitigate undesired interference. In this task, we investigate the multi-band capability of the bio-inspired self-destructive steganography.

With conventional spread spectrum stealth transmission, the stealth channel usually spans across a large spectral region so that it can hide underneath the system noise. Therefore, there is no spectral vacancy for another stealth channel because two spectrally overlapping stealth channel will not be able to be separated at the receiver.

Although there are other existing multiband microwave photonic FIR schemes, however, most photonic approach for multiband RF signal processing lacks the ability to tailor the location of the constructive/destructive spectral location, and to individually control the spectral characteristic of each spectral location. Furthermore, each spectral point in a multi-point processor has a close relationship with one another—tuning of one spectral point will lead to a related change in another spectral point. This is caused by the optical comb for each spectral point being tightly tied to each other through the use of the same interferometric device. Therefore, none of the existing approaches can achieve fully independent control of frequency, bandwidth, amplitude, group delay slope, or spectral shape of each of the spectral point in a multi-band stealth transmitter. This can result in the unintentional revelation of the stealth signal to the attacker. Neither electronics nor photonics approaches are capable of providing multi-band spectral processing, which can be provided using a self-destructive steganography technique.

In the disclosed steganography scheme, the stealth signal does not hide by using a wide spectrum. Instead an optical comb carrier is used such that a FIR relationship is formed, and the stealth signal 206 is destructively interfered to the eavesdropper, but it is constructively interfered when the legit receiver is receiving the stealth signal 206 at the designated location. Since interference is used, it is possible to allow multiple optical comb carriers to overlap in the optical spectral domain for different stealth channels. The legit receiver will be able to distinguish the designated channel based on the same FIR design.

Using a multi-band RF spectral processor configured to enable individual control of spectral properties at each spectral control point, each RF control point can be considered as an individual. Using inverse Fourier transform and FIR design rule(s) to determine the corresponding optical parameters, a series of shaped cosine functions can be combined to achieve the desired RF stealth properties. Using this methodology, a user can have full control of every single parameter, including amplitude, frequency, bandwidth, spectral shape, and even group delay slope of each spectral stealth control point.

Figure 8A:
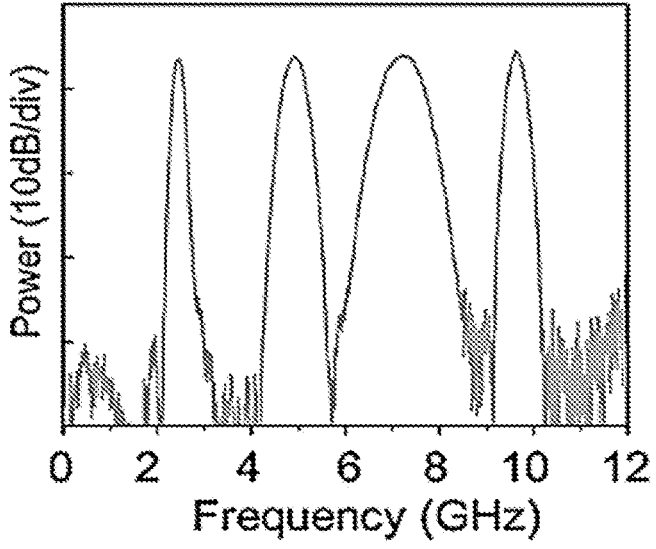
FIGS. 8A-8C illustrate examples of preliminary results on heterogeneous multi-spectral point control, in accordance with various embodiments of the present disclosure.
Figure 8B:
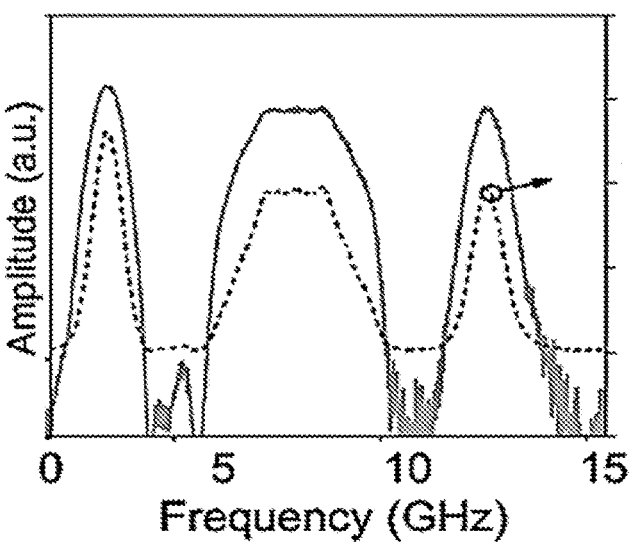
Figure 8C:
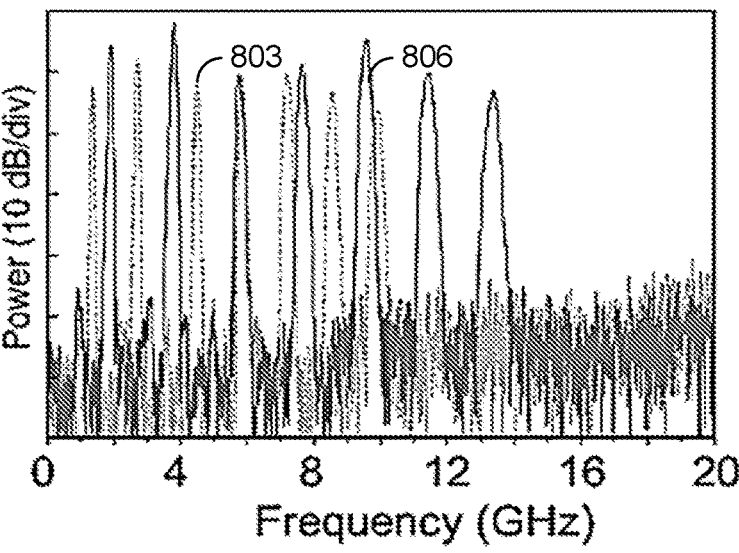

A multiband microwave photonic filter configuration with multiple constructive/destructive interference spectral points based upon the design methodology has been tested. FIGS. 8A-8C show preliminary results on heterogenerous multi-spectral point control. The preliminary results show that three constructive interfered spectral location can be achieved, and both the bandwidth and spectral shape can be individually controlled among all the spectral points. FIG. 8A illustrates an example of four constructively interfered points with different bandwidth and FIG. 8B shows an example of three constructively interfered points with mixed spectral shapes and adjustable amplitude. By increasing the number of overlapping optical comb carriers, the number of constructive interfered spectral locations can be increase to 7, or other appropriate number, where each location can be used for a stealth channel. FIG. 8C shows an example of the change in spectral point spacing as dispersion changes. Curve 803 shows multiband spectral points with a large dispersion, while curve 806 shows multiband spectral points with a smaller dispersion.

The use of photonics and the unique design methodology can allow precise tailoring of the stealth self-destructive property of multi-band RF signal as well as enabling different stealth frequency bands to be supported for multi-function microwave systems and enable truly customizable self-destructive stealth transmission over a wide bandwidth.

Figure 9:
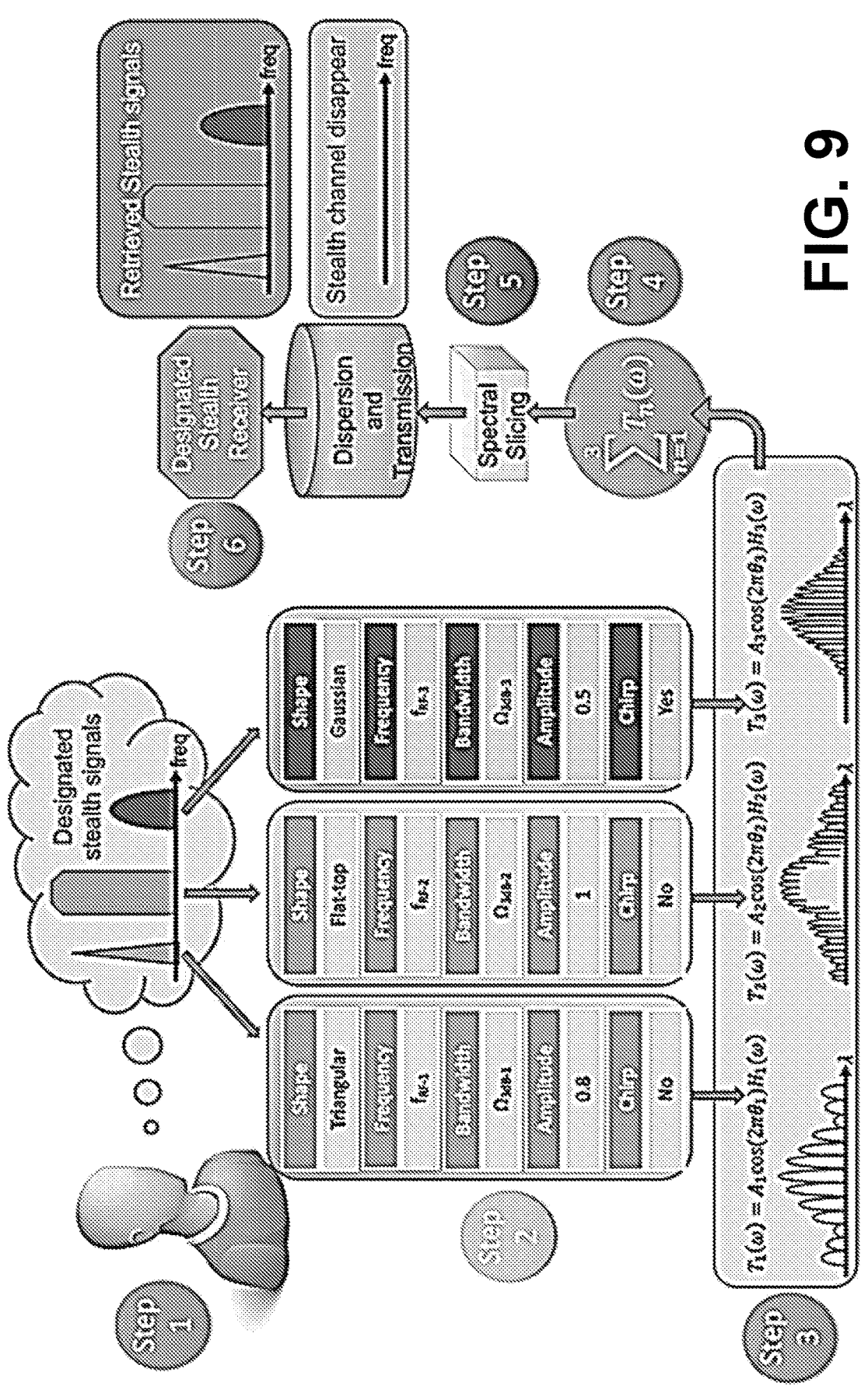
FIG. 9 illustrates an example of a FIR multiband/multi-channel self-destructive stealth design methodology, in accordance with various embodiments of the present disclosure.

Referring next to FIG. 9, shown is an example of a design of a multi-band/multi-channel self-destructive bio-inspired stealth system. The system involves both methodology development and hardware design. The methodology can be used to design the optical comb parameters for each channel individual control during multiband/multi-channel implementation and to determine the dispersion used such that all the channels could be invisible and self-destructive to an attacker. The design of hardware may support up to, e.g., 10 stealth channels simultaneously.

The proposed FIR multiband/multi-channel self-destructive stealth design methodology is shown in FIG. 9. Beginning at step 1, the desired frequency bands for stealth channels can be determined. Next at step 2, the properties of each constructively/destructively interfered point (e.g., shape, frequency, bandwidth, amplitude, chirp, etc.) can be individually designed. At step 3, the corresponding shaped cosine function can be automatically generated for each stealth channel, and all the shaped cosine functions can be combined into a single final function at step 4. The final function can be used for control of the spectral slicing device hardware at step 5, such that all the stealth channels are invisible and self-destructive along the transmission. At step 6, the multi-channel stealth signals can be recovered by designated stealth receivers.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for radio frequency (RF) steganography, comprising:

generating an amplified spontaneous emission (ASE) broadband light, the ASE broadband light having wavelength and intensity corresponding to background noise of a photonic system;

spectrally slicing the ASE broadband light to achieve taps for generating a dynamic photonic finite impulse response (FIR) in an RF domain;

generating a stealth-modulated optical comb carrier by combining a RF stealth signal with the spectrally sliced ASE broadband light;

passing the stealth-modulated optical comb carrier to a dispersive medium to achieve dynamic photonic FIR in the RF domain; and transmitting the stealth-modulated optical comb carrier via a transmission fiber, wherein the stealth-modulated optical comb carrier is combined with a public signal and system noise prior to transmission.

2. The method of claim 1, wherein the stealth-modulated optical comb carrier is transmitted to a stealth receiver and a public receiver via the transmission fiber.

3. The method of claim 1, wherein the transmission fiber has a positive dispersion sign.

4. The method of claim 3, wherein the transmission fiber comprises a dispersion compensating fiber at a distal end.

5. The method of claim 1, wherein the stealth signal is retrieved by a stealth receiver comprising a matched dispersion medium providing constructive interference at a stealth signal frequency associated with the stealth signal.

6. The method of claim 5, wherein the matched dispersion medium is a dispersion compensation fiber.

7. The method of claim 5, wherein the stealth signal is converted to a digital signal for processing by digital signal processing circuitry.

8. A method for radio frequency (RF) steganography, comprising:

generating an amplified spontaneous emission (ASE) broadband light, the ASE broadband light having wavelength and intensity corresponding to background noise of a photonic system;

spectrally slicing the ASE broadband light to achieve taps for generating a dynamic photonic finite impulse response (FIR) in an RF domain;

generating a stealth-modulated optical comb carrier by combining a RF stealth signal with the spectrally sliced ASE broadband light, wherein generating the stealth-modulated optical comb carrier comprises combining a plurality of stealth signals with the spectrally sliced ASE broadband light;

passing the stealth-modulated optical comb carrier to a dispersive medium to achieve dynamic photonic FIR in the RF domain; and transmitting the stealth-modulated optical comb carrier via a transmission fiber.

9. The method of claim 8, wherein the stealth-modulated optical comb carrier is transmitted to a plurality of stealth receivers via the transmission fiber.

10. The method of claim 9, wherein each of the plurality of stealth receivers comprises a matched dispersion medium providing constructive interference at a stealth signal frequency associated with one of the plurality of stealth signals.

11. The method of claim 8, wherein each of the plurality of stealth signals is associated with a corresponding stealth signal frequency.

12. The method of claim 11, wherein the stealth-modulated optical comb carrier is received by a stealth receiver comprising a plurality of matched dispersion mediums each providing constructive interference at a corresponding stealth signal frequency associated with at least one of the plurality of stealth signals.

13. The method of claim 8, wherein the RF stealth signal is retrieved by a stealth receiver comprising a matched dispersion medium providing constructive interference at a stealth signal frequency associated with the stealth signal.

14. The method of claim 13, wherein the matched dispersion medium is a dispersion compensation fiber.

15. A system for radio frequency (RF) steganography, comprising:

a stealth transmitter coupled to a transmission fiber, the stealth transmitter configured to:

generate a stealth-modulated optical comb carrier by combining a stealth signal with a spectrally sliced amplified spontaneous emission (ASE) broadband light;

pass the stealth-modulated optical comb carrier through a dispersive medium to achieve dynamic photonic FIR in the RF domain; and transmit the stealth-modulated optical comb carrier to a stealth receiver via the transmission fiber; and the stealth receiver coupled to the transmission fiber, the stealth receiver comprising a matched dispersion medium that provides constructive interference at a stealth signal frequency associated with the stealth signal.

16. The system of claim 15, wherein the stealth transmitter comprises an optical modulator that combines the stealth signal with the spectrally sliced ASE broadband light.

17. The system of claim 16, wherein the stealth transmitter comprises an arbitrary waveform generator (AWG) configured to generate the stealth signal from stealth data and a public signal from public data.

18. The system of claim 15, wherein the public signal is modulated by an optical modulator onto a DFB laser output and combined with the stealth-modulated broadband optical carrier prior to transmission via the transmission fiber.

19. The system of claim 15, wherein generating the stealth-modulated broadband optical carrier comprises combining a plurality of stealth signals with the spectrally sliced ASE broadband light.

20. The system of claim 15, wherein the stealth receiver comprises a photodetector and digital processing circuitry configured to convert the stealth signal to a digital signal for processing.

* * * * *